(12) United States Patent
Hines

(10) Patent No.: US 6,514,006 B1
(45) Date of Patent: Feb. 4, 2003

(54) SAFETY MARKERS FOR DRIVEWAYS, ROADS AND RUNWAYS

(76) Inventor: James E. Hines, 1610 County Rd. #603, New Brochton, AL (US) 36351

(*) Notice: Subject to any disclaimer, the term of this patent is extended or adjusted under 35 U.S.C. 154(b) by 0 days.

(21) Appl. No.: 10/075,575

(22) Filed: Feb. 12, 2002

(51) Int. Cl.⁷ .................................................. E01F 9/00
(52) U.S. Cl. ........................ 404/9; 116/63 R; 116/63 C
(58) Field of Search ..................... 404/9, 10; 116/63 R, 116/63 P, 63 C; 40/607, 612

(56) References Cited

U.S. PATENT DOCUMENTS

| | | | |
|---|---|---|---|
| 2,202,306 A | | 5/1940 | Arbuckle |
| 3,111,303 A | * | 11/1963 | Olson ........................... 256/19 |
| 3,204,355 A | * | 9/1965 | Whitman ...................... 40/607 |
| 3,421,473 A | * | 1/1969 | Weichenrieder ............. 116/173 |
| 3,709,112 A | * | 1/1973 | Ebinger ...................... 256/13.1 |
| 3,970,033 A | * | 7/1976 | Lindner et al. ............ 116/63 P |
| 4,092,081 A | | 5/1978 | Schmanski |
| 4,245,922 A | | 1/1981 | Auriemma |
| 4,923,164 A | * | 5/1990 | Stenberg ...................... 248/156 |
| 4,997,307 A | * | 3/1991 | Schmanski ..................... 256/1 |
| 5,066,163 A | * | 11/1991 | Whitaker ...................... 256/19 |
| 5,090,348 A | * | 2/1992 | Hugron .................... 116/63 P |
| 5,273,371 A | * | 12/1993 | Hugron ......................... 404/10 |
| 5,468,093 A | * | 11/1995 | Voigt ........................... 404/10 |
| 5,500,642 A | * | 3/1996 | Battle .......................... 116/203 |
| 5,518,337 A | * | 5/1996 | Modlin ..................... 116/63 R |
| 5,597,262 A | | 1/1997 | Beavers et al. |
| 5,620,277 A | | 4/1997 | Cole, Sr. et al. |
| 5,809,733 A | * | 9/1998 | Venegas, Jr. ................ 256/13.1 |
| D399,261 S | | 10/1998 | Humphrey |
| 5,908,262 A | * | 6/1999 | Ahn ......................... 116/63 P |
| 6,186,699 B1 | * | 2/2001 | Kulp et al. ............... 116/63 C |

\* cited by examiner

*Primary Examiner*—Gary S. Hartmann
(74) *Attorney, Agent, or Firm*—Gene Scott-Patent Law & Venture Group

(57) ABSTRACT

A reflector apparatus comprises an upright elongated cylinder having a circular wall closed at one end by a semi-spherical hollow cavity wall, and closed at the other end by a plug fitted within the circular wall of the cylinder and fixed therein, the plug tapered downwardly to an elongated axial stake having a downwardly directed point. A rod extends axially upwardly from the semi-spherical hollow cavity wall for receiving a reflective plate, and a series of reflective stripes are circumferentially positioned in spaced arrangement over an outer surface of the circular wall.

1 Claim, 2 Drawing Sheets

Fig. 1
Fig. 2
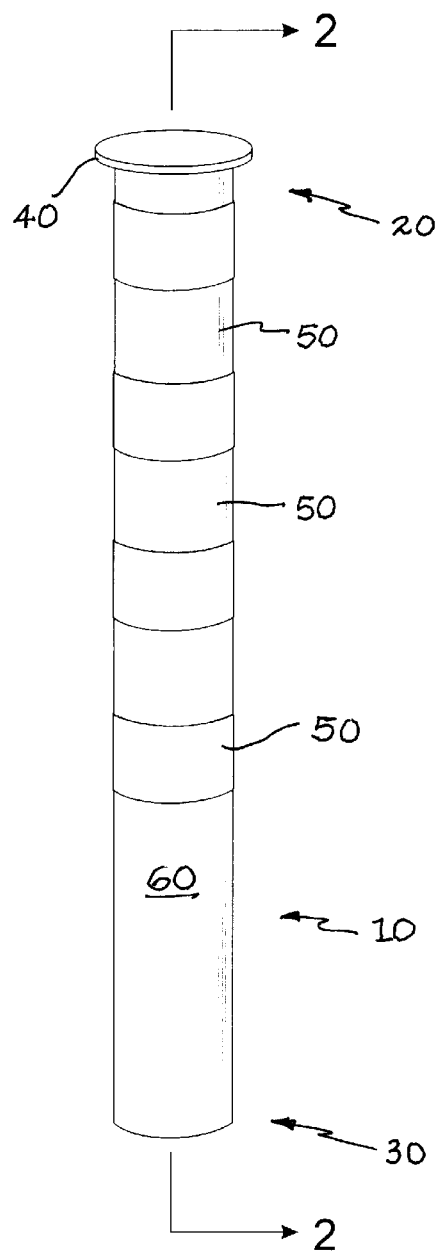
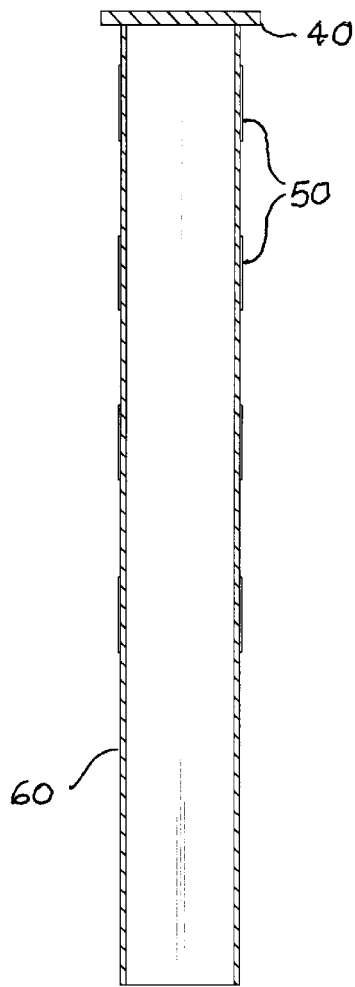

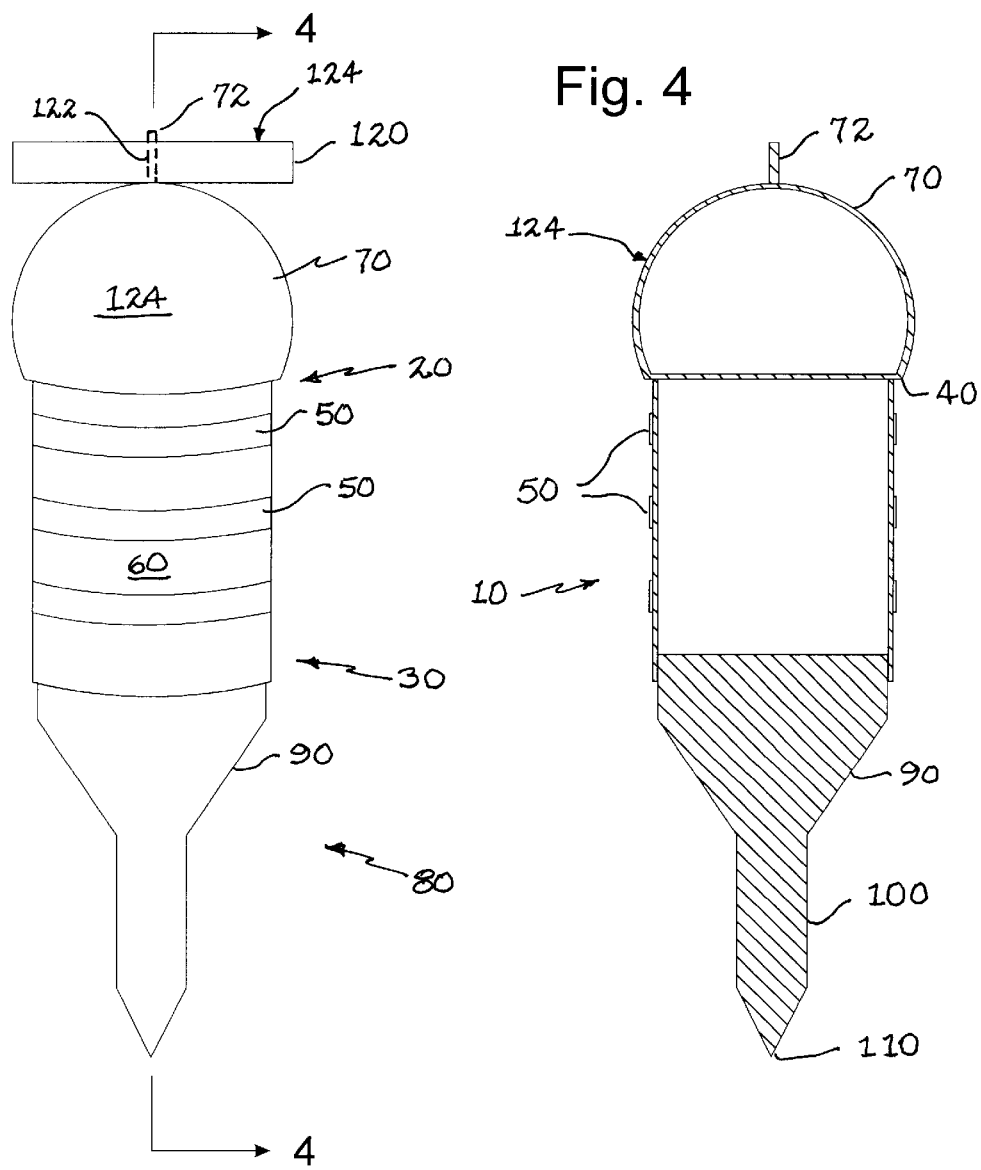

SAFETY MARKERS FOR DRIVEWAYS, ROADS AND RUNWAYS

BACKGROUND OF THE INVENTION

1. Field of the Invention

This invention relates generally to road markers and delineators and more particularly to a marker with light reflective tapes positioned for demarking a road or runway.

2. Description of Related Art

The following art defines the present state of this field:

Humphrey, Des. 399,261 describes an emergency roadside sign design.

Arbuckle, U.S. Pat. No. 2,202,306 describes

Schmanski, U.S. Pat. No. 4,092,082 describes a post designed for sign or guide marker use having sufficient longitudinal rigidity to withstand a force driving it into the ground and sufficient elasticity to permit nondestructive deformation upon impact by a moving object, with subsequent restoration to an original, upright position. Various construction materials and/or structural configurations are disclosed for obtaining this dual character without incurring high production and material costs.

Auriemma, U.S. Pat. No. 4,245,922 describes a rigid self-supporting highway delineator post having reflective material mounted at the upper end and a first flex area at a height above grade and a second flex area located immediately below the reflective material whereby the post is non-destructively bent down about the lower flex area when hit by a moving vehicle and may be bent about the upper flex area to facilitate removal and insertion of sheets of reflective material.

Beavers et al., U.S. Pat. No. 5,597,262 describes a traffic bollard mountable to a path surface for providing a barrier to a vehicle moving on the path surface. The bollard includes a stanchion member extending along a longitudinal axis from an upper distal end to a lower proximal end biasedly attachable to the path surface in a normally upright position. The stanchion member is flexible along substantially the entire extent of its longitudinal axis to be resiliently deflectable from its normally upright position upon the bollard being contacted with a predetermined amount of force by the moving vehicle. At least one collar is rotatably mounted about the stanchion member along the longitudinal axis thereof. The collar extends intermediate the distal and proximal ends of the stanchion member and freely rotates about the longitudinal axis thereof upon being contacted by the moving vehicle.

Cole, Sr. et al., U.S. Pat. No. 5,620,277 describes a device adapted to be at least partially inserted into an aggregation of material and retained therein. The device has an opening formed therethrough to receive a novel anchoring component. The device may be a marker which advantageously has a Miles Utility configuration, and which has the opening formed in a stake portion of the marker. The anchor has a bridge element which extends through the opening to hold a pair of legs in an opposed and upright position. The legs resiliently grasp the opposite sides of the marker to prevent the anchor from falling out or being bumped out of the opening. There is also disclosed a two-piece marker with the Miles Utility configuration for the post which is resiliently joined to a support to provide a universal hinge action to prevent the wings from being crumpled or permanently deformed to prevent or inhibit the post from returning to an upright position.

The prior art teaches reflective signs and delineators but does not teach such a device with improved drainage and with the ability to see reflections from any angle above the surface of the device. The present invention fulfills these needs and provides further related advantages as described in the following summary.

SUMMARY OF THE INVENTION

The present invention teaches certain benefits in construction and use which give rise to the objectives described below.

A reflector apparatus comprises an upright elongated cylinder having a circular wall closed at one end by a semi-spherical hollow cavity wall, and closed at the other end by a plug fitted within the circular wall of the cylinder and fixed therein, the plug tapered downwardly to an elongated axial stake having a downwardly directed point. A rod extends axially upwardly from the semi-spherical hollow cavity wall for receiving a reflective plate, and a series of reflective stripes are circumferentially positioned in spaced arrangement over an outer surface of the circular wall.

A primary objective of the present invention is to provide an apparatus and method of use of such apparatus that provides advantages not taught by the prior art.

Another objective is to provide such an invention capable of reflecting light at night.

A further objective is to provide such an invention capable of being easily mounted in a ground surface with improved water drainage.

A still further objective is to provide such an invention capable of being easily seen from any angle above.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 1 is a perspective view of a preferred embodiment of the invention;

FIG. 2 is a section view taken along line 2—2 in FIG. 1;

FIG. 3 is a side elevational view of a further embodiment of the invention; and

FIG. 4 is a section view taken along line 4—4 in FIG. 3.

DETAILED DESCRIPTION OF THE INVENTION

The above described drawing figures illustrate the invention in at least one of its preferred embodiments, which is further defined in detail in the following description.

The present invention is a reflector apparatus comprising, as shown in FIGS. 1 and 2, an upright elongated right cylinder of extruded plastic pipe or metal tubing, having a circular wall 10 closed at one end 20, an upper end, and open at the other end 30, a lower end. A flange lip 40 extends peripherally, radially, outwardly, and uniformly, from the closed end 20 for improved gripping and drainage of the apparatus. This is critical to the long life of the invention as the flange lip 40 allows rain water to drip directly to the ground without flowing over the exterior of the wall 10. The importance of this will become apparent below. A series of reflective stripes 50 are circumferentially positioned in spaced arrangement over an outer surface 60 of the circular wall 10.

Preferably, the stripes 50 are of a reflective tape or other reflective material well known in the art. By preventing water flow over such tape, etc., longer life of this product is assured. They are preferably spaced at intervals approximately equivalent to the width of the stripes 50 to provide a neat and attractive appearance and to provide a broad coverage while using only 50%, or less, of the reflective material, which is relatively expensive, that might otherwise be needed to achieve approximately the same result. This spacing is considered critical to the economic viability of the invention and thereby to its commercial success in the marketplace.

In an alternate embodiment, the reflector apparatus comprises the upright elongated cylinder having a circular wall 10 as above, but in this embodiment, the circular wall 10 is closed at the one end 20 by a semi-spherical hollow cavity wall 70 with a reflective surface 124 on its exterior, and closed at the other end 30 by a plug 80 fitted within the circular wall 10 of the cylinder and fixed therein, preferably by a bonding agent or any other means. The plug 80 is designed to break away from the circular wall 10 upon impact. The plug 80 is tapered downwardly at a transition portion 90 to an elongated axial stake 100 having a downwardly directed point 110. This stake 100 enables the apparatus to be easily pushed into soft ground. A rod 72 extends axially upwardly from the semi-spherical hollow cavity wall 70 at its pinnacle. The series of reflective stripes 50 are, as above, circumferentially positioned in spaced arrangement over the outer surface 60 of the circular wall 10. The spacing of the stripes is as defined above.

Preferably, a reflective plate 120 has a centrally located hole 122 therein, as shown in FIG. 3, for receiving the rod for mounting the reflective plate 120 atop the cavity wall 70 with the reflective surface 124 facing skyward.

In use, the apparatus is mounted in a vertical orientation by engaging the ground upon which it is placed. This may be along the side of a driveway, a road or a runway, etc. In such use, the apparatus is placed in multiples with spacing between them. This may be accomplished in any manner such as by inserting into a hole and backfilling with sand or cement, pressing into a soft surface, etc. The second noted embodiment is enable for reflecting light from any angle above due to its spherical surface. In the case where it will be sighted from directly above, the plate 120 is mounted atop the cavity wall 70 as shown in FIG. 3.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A reflector apparatus comprising: an upright elongated cylinder having a circular wall closed at one end by a semi-spherical hollow cavity wall with a reflective exterior surface visible from any angle above the apparatus, and closed at the other end by a plug fitted within the circular wall of the cylinder and fixed therein in a manner for separation therewith under impact, the plug terminating with an elongated axial stake adapted for engagement with a ground surface; a series of reflective stripes circumferentially positioned in spaced arrangement over an outer surface of the circular wall and visible laterally therefrom in any direction; and a reflective plate having a centrally located hole therein which receives a rod extending vertically from the hollow cavity wall, thereby mounting the reflective plate atop the cavity wall in a horizontal attitude visible from directly above.

* * * * *